US010901214B2

(12) United States Patent
Yuan (10) Patent No.: US 10,901,214 B2
(45) Date of Patent: Jan. 26, 2021

(54) METHOD AND DEVICE FOR CONTROLLING DISPLAY OF IMAGE AND HEAD-MOUNTED DISPLAY (71) Applicant: NETEASE (HANGZHOU) NETWORK CO., LTD., Hangzhou (CN)

(72) Inventor: Dongsheng Yuan, Hangzhou (CN)

(73) Assignee: NETEASE (HANGZHOU) NETWORK CO., LTD., Zhejiang (CN)

(*) Notice: Subject to any disclaimer, the term of this patent is extended or adjusted under 35 U.S.C. 154(b) by 0 days.

(21) Appl. No.: 15/527,331

(22) PCT Filed: Apr. 12, 2017

(86) PCT No.: PCT/CN2017/080272
§ 371 (c)(1),
(2) Date: Jun. 29, 2017

(87) PCT Pub. No.: WO2018/133221
PCT Pub. Date: Jul. 26, 2018

(65) Prior Publication Data
US 2019/0331916 A1 Oct. 31, 2019

(30) Foreign Application Priority Data
Jan. 22, 2017 (CN) .......................... 2017 1 0135062

(51) Int. Cl.
*G06F 3/01* (2006.01)
*G02B 27/01* (2006.01)
(Continued)

(52) U.S. Cl.
CPC ......... *G02B 27/0172* (2013.01); *G02B 30/26* (2020.01); *G06F 3/013* (2013.01); *G09G 3/36* (2013.01); *G02B 2027/0187* (2013.01)

(58) Field of Classification Search
CPC .............. G02B 27/0172; G02B 27/225; G02B 2027/0187; G09G 3/36; G06F 3/013
See application file for complete search history.

(56) References Cited

U.S. PATENT DOCUMENTS

2013/0285885 A1 10/2013 Nowatzyk et al.
2014/0168783 A1 6/2014 Luebke et al.
(Continued)

FOREIGN PATENT DOCUMENTS

CN  1951340 A   4/2007
CN  101681145 A  3/2010
(Continued)

OTHER PUBLICATIONS

Search report of CN Priority application No. 201710047309.X, report dated May 20, 2018.
(Continued)

*Primary Examiner* — Premal R Patel
(74) *Attorney, Agent, or Firm* — Gang Yu (57) ABSTRACT

The disclosure discloses a method and device for controlling display of an image and a Head-Mounted Display (HMD). The method includes: three-dimensional reconstruction is performed on an initial image to obtain a three-dimensional reconstructed light field by adopting a preset light field display manner; the three-dimensional reconstructed light field is segmented, according to wavefront map information, into a plurality of focal planes, wherein the wavefront map information is obtained by scanning each eye of a user watching the initial image through a wavefront aberrometer, and the plurality of focal planes respectively correspond to diopters of different parts of each eye, and are focused on a retina of each eye; and the plurality of focal planes are controlled to be focused on the retina of each eye of the user to display the initial image as an image to be displayed.

17 Claims, 3 Drawing Sheets (51) Int. Cl.
G09G 3/36 (2006.01)
G02B 30/26 (2020.01)

(56) References Cited

U.S. PATENT DOCUMENTS

| | | | |
|---|---|---|---|
| 2014/0267460 A1 | 9/2014 | Bolas | |
| 2015/0228121 A1* | 8/2015 | Tsukahara | G06F 3/04817 |
| | | | 345/419 |
| 2015/0262424 A1 | 9/2015 | Tabaka et al. | |
| 2015/0362992 A1* | 12/2015 | Jacobs | G02B 27/01 |
| | | | 345/8 |
| 2016/0366392 A1* | 12/2016 | Raghoebardajal | H04N 19/132 |
| 2017/0000341 A1* | 1/2017 | Samec | A61B 3/085 |
| 2017/0010466 A1 | 1/2017 | Klug et al. | |

FOREIGN PATENT DOCUMENTS

| | | |
|---|---|---|
| CN | 102681183 A | 9/2012 |
| CN | 103995356 A | 8/2014 |
| CN | 104598180 A | 5/2015 |
| CN | 104777615 A | 7/2015 |
| CN | 105652444 A | 6/2016 |
| CN | 105892061 A | 8/2016 |
| CN | 106199958 A | 12/2016 |
| CN | 205880368 U | 1/2017 |
| CN | 106526867 A | 3/2017 |

OTHER PUBLICATIONS

Search report of PCT Application No. PCT/CN2017/080272.
Search report of Priority CN application No. 2017101350627 dated Feb. 20, 2020.

* cited by examiner

METHOD AND DEVICE FOR CONTROLLING DISPLAY OF IMAGE AND HEAD-MOUNTED DISPLAY

TECHNICAL FIELD

The disclosure relates to the field of image processing, and in particular to a method and device for controlling display of an image and a Head-Mounted Display (HMD).

BACKGROUND

Along with development of a Virtual Reality (VR) technology, VR applications adopting HMDs such as Oculus Rift, Cardboard and Gear VR, for example, VR glasses, as carriers are continuously emerging, and the HMDs may bring unprecedented fidelity to users, so that the users may be completely immersed in worlds of the VR applications, and a very high sense of immersion is achieved. However, for example, in a VR game, there is a hyperopia or myopia group exceeding more than ⅓ of the users, and it is difficult for these users suffering from hyperopia or myopia to see clearly game images, so that game experiences of these users are greatly reduced. Not only for the VR game, when these users use the HMDs for other activities, for example: watching television programs or movies, there also exists a trouble of difficulty in seeing clearly the display images due to a problem of hyperopia or myopia. Therefore, how to resolve a conflict between VR HMDs and hyperopla or myopia glasses becomes a problem urgent to be solved by each manufacturer in the industry.

According to statistics, there are 2 billion people worldwide required to wear glasses in daily life, and more than 80% of teenagers in Asia belong to a myopia group. It is thus clear that hyperopla or myopia is a globally common problem.

For a large hyperopia or myopia group, each major HMD manufacturer mainly adopts the following three solutions at present.

A first solution: a user is guided to wear an HMD after wearing his/her own glasses, wherein the HMD manufacturer may add ergonomic optimization (for example: notches convenient for extension of legs of the glasses) onto the HMD.

However, this solution has obvious shortcomings that: wearing comfort is relatively poor, a sense of pressure is easily formed, and moreover, the user may not experience acute movement VR contents after wearing the HMD because a change in a position of the glasses may cause influence on focusing.

A second solution: the HMD provides a mechanical focal length regulation function, thereby enabling the myopia user to directly wear the HMD without wearing the glasses.

However, this solution has an obvious shortcoming that: it is difficult to meet requirements of a user group with high myopia, great differences between eyesight of left and right eyes, astigmatism and the like.

A third solution: no additional support is provided, and the user may experience optimal VR images only by wearing contact lenses or by surgical correction.

However, this solution has an obvious shortcoming of obvious hazards to health of the user.

Thus it can be seen that current solutions to HMDs for the hyperopia or myopia group may not completely cover all users and may cause discomfort and even health hazards to the users in different extents. Therefore, if the HMDs may implement vision correction of hyperopia or myopia users, vision experiences of this user group may be greatly improved.

Different from the three solutions, two improved technical solutions for improving vision experiences of users through HMDs are also provided in the related art.

Therefore, the following two improved solutions are also provided on the basis of the abovementioned technical shortcomings in the related art.

A first solution: a technical solution widely used at present for correcting vision aberrations of the hyperopia or myopia group by noninvasive means implements adaptation of images by virtue of a self-adjustment liquid crystal. Specific implementation steps are as follows.

Step 1: a lens focal length detector is used to detect a lens focal length change of an eyeball lens.

Step 2: an Image output by a display screen is displayed to a user through a self-adjustment liquid crystal.

It is important to note that optical parameters (for example: a focal length of a convex lens) of an ordinary optical element (for example: the convex lens) are fixed, and the self-adjustment liquid crystal may change corresponding optical parameters according to a change in at least one input parameter, thereby implementing self-adjustment regulation.

Step 3: the self-adjustment liquid crystal is connected with the lens focal length detector to acquire real-time lens focal length data of the user.

Step 4: numerical values required to be adjusted by the liquid crystal are calculated according to the acquired lens focal length data.

Step 5: focusing of the image output by the display screen on a retina of the user is finally ensured.

From the above-mentioned operation steps, the technical solution adopting the self-adjustment liquid crystal provides customized images for the user in a manner of acquiring the focal length of the user in real time by virtue of the adjustable liquid crystal, and a core technical concept of the technical solution is to provide different images for users with different diopters (element for measuring a refracting capability of a lens, for example: an eye) and ensure that these images may be focused on retina of each eye of the user.

However, the technical solution has a shortcoming that: although devices applied in this technical solution is simple in structure, low in cost and easy to miniaturize, the following problems may still exist during application to the HMDs:

(1) adjustment of the liquid crystal may not completely simulate a real zooming and focusing process of a human eye, and a sudden change in an external diopter may make the user feel dizzy and uncomfortable; and (2) there exists a threshold value limit to self-adjustment of the liquid crystal, that is, adjustment may be merely performed within a certain focal length range, and may not completely cover the hyperopia or myopia user group, and if a covered range is wider, a specification requirement on the liquid crystal is higher, so that product cost may be greatly increased.

From the above, the self-adjustment liquid crystal manner may solve the problem of hyperopia or myopia by automatic focusing to a certain extent, but may not ensure vision experiences of a player due to the limitation of a principle of the self-adjustment liquid crystal manner; and moreover, performance of the self-adjustment liquid crystal manner is limited to a focusing range of the adjustable liquid crystal, and it is difficult to cover the hyperopia or myopia user group, so that it is unavailable to the HMDs.

A second solution: a light field display technology, also called as a light field three-dimensional reconstruction technology, has broad application prospect in VR. For each object, no matter whether the object is self-luminous or may diffusely reflect light emitted to the object by another light source, a unique light intensity distribution may be formed around the object. A human eye may objectively sense a three-dimensional state of the object well according to the unique light intensity distribution; and the unique light intensity distribution is called as a light field of the object (i.e. a set of light emitted from any point in a space in any direction).

It is important to note that the human eye may observe the object in a real world from every angle. This is because the object may emit light to any direction in the space, and then the human eye may see the object from any angle. Therefore, a light field is a reason why the human eye may capture the object.

For example: in a process of observing a specific three-dimensional object, light emitted to an observer by each volume element of the three-dimensional object forms a light field of the three-dimensional object, and the observer may capture the three-dimensional object through the light field.

If a cylindrical surface screen is inserted between the three-dimensional object and the observer, all the light of the light field emitted by the three-dimensional object may form intersection points with the cylindrical surface screen. There is made such a hypothesis that the cylindrical surface screen may not change a propagation direction of the light and may also not absorb any light, and then, the observer may still see the three-dimensional object behind the cylindrical surface screen.

Furthermore, if the cylindrical surface screen emits light with the same distribution as the three-dimensional object, the observer may still really see the three-dimensional object even though the three-dimensional object does not exist behind the cylindrical surface screen.

The above is a principle of light field display. At present, common light field display technologies may include: a scanning panoramic light field reconstruction technology, a mosaic light field reconstruction technology and an integrated light field reconstruction technology. Although adopted technical means are different, a fundamental aim to be fulfilled is that: a large amount of information is displayed to recover and reconstruct three-dimensional display of a real space seen by the human eye on the basis of reducing redundant information in three-dimensional information of the space.

However, the technical solution has a shortcoming that: although the light field display technology may recover an object by virtue of a real light field distribution of the object through display equipment such as a Light-Emitting Diode (LED) and an existing algorithm technology, thereby implementing real three-dimensional space display, what is implemented is that "a three-dimensional object or three-dimensional scenario which actually does not exist but is accurately recovered may be seen with a naked eye from any angle", which actually does not solve a problem of blurred vision experiences when users of the hyperopia or myopia group uses HMDs. For example: although a very delicate relief may be recovered by virtue of the light field display technology, a user may still not clearly see a specific content on the relief at a place which is far enough (for example: 100 meters). Therefore, utilizing the light field display technology may display very rich data, but only recovers a three-dimensional object and may still not solve the focusing problem of hyperopia or myopia.

For the abovementioned problems, there are yet no effective solutions at present.

SUMMARY

At least one embodiment of the disclosure provides a method and device for controlling display of an image and an HMD, so as to at least solve a technical problem that good vision experiences may not be achieved when a hyperopia or myopia user watches the image with the HMD in the related art.

In an embodiment of the disclosure, a method for controlling display of an image is provided, which includes: performing three-dimensional reconstruction on an initial Image to obtain a three-dimensional reconstructed light field by adopting a preset light field display manner; segmenting, according to wavefront map information, the three-dimensional reconstructed light field into a plurality of focal planes, wherein the wavefront map information is obtained by scanning each eye of a user watching the initial image through a wavefront aberrometer, and the plurality of focal planes respectively correspond to diopters of different parts of each eye, and are focused on a retina of each eye; and controlling the plurality of focal planes to be focused on the retina of each eye of the user to display the initial image as an image to be displayed.

In an example embodiment, segmenting the three-dimensional reconstructed light field into the plurality of focal planes according to the wavefront map information includes: acquiring, according to position information of each pixel in the image to be displayed, position information of a cornea point corresponding to the position information of each pixel and a focal length corresponding to the position information of the cornea point from the wavefront map information; acquiring position information of each incident point of the three-dimensional reconstructed light field by adopting the position information of each pixel and the acquired focal length; controlling, according to the position information of each incident point and the position information of each cornea point, an incident angle of incident light emitted from each incident point; and determining position information of a virtual point corresponding to the position information of each incident point by adopting the acquired focal length and the incident angle, and generating the plurality of focal planes according to position information of each virtual point, wherein each focal plane is a virtual plane perpendicular to an axis of each eye, and each virtual point is a virtual image of each pixel in the image to be displayed on each focal plane.

In an example embodiment, controlling the incident angle of the incident light emitted from each incident point includes: projecting, according to the position information of each incident point, the incident light onto a first display screen; determining, according to the wavefront map information, a positional relationship between the first display screen and a second display screen and a distance between the first display screen and the second display screen; and controlling, according to the positional relationship and the distance, a propagation direction of light transmitted by the first display screen to control the incident angle.

In an example embodiment, controlling the plurality of focal planes to be focused on the retina of each eye of the user to correct the initial image into the image to be displayed includes: respectively acquiring the position information of each virtual point corresponding to the position information of each pixel in the image to be displayed from the plurality of focal planes; and executing an aggregation operation on the acquired position information of each virtual point to obtain the image to be displayed.

In an example embodiment, distances between each focal plane in the plurality of focal planes and each eye of the user are different, and an image presented in each focal plane in the plurality of focal planes is the same as the initial image.

In an example embodiment, the position information of each cornea point, the position information of each incident point and the position information of each virtual point are all coordinate information in a coordinate system formed by an axial centerline of an eyeball of the user and a plane perpendicular to the axial centerline.

In another embodiment of the disclosure, a device for controlling display of an image is provided, which includes:

a reconstruction component, arranged to perform three-dimensional reconstruction on an initial image to obtain a three-dimensional reconstructed light field by adopting a preset light field display manner; a segmenting component, arranged to segment, according to wavefront map information, the three-dimensional reconstructed light field into a plurality of focal planes, wherein the wavefront map information is obtained by scanning each eye of a user watching the initial image through a wavefront aberrometer, and the plurality of focal planes respectively correspond to diopters of different parts of each eye, and are focused on a retina of each eye; and a control component, arranged to control the plurality of focal planes to be focused on the retina of each eye of the user to display the initial image as an image to be displayed.

In an example embodiment, the segmenting component includes: a first acquisition element, arranged to acquire, according to position information of each pixel in the image to be displayed, position information of a cornea point corresponding to the position information of each pixel and a focal length corresponding to the position information of the cornea point from the wavefront map information; a second acquisition element, arranged to acquire position information of each incident point of the three-dimensional reconstructed light field by adopting the position information of each pixel and the acquired focal length; a first processing element, arranged to control, according to the position information of each incident point and the position information of each cornea point, an incident angle of incident light emitted from each incident point; and a second processing element, arranged to determine position information of a virtual point corresponding to the position information of each incident point by adopting the acquired focal length and the incident angle, and generate the plurality of focal planes according to position information of each virtual point, wherein each focal plane is a virtual plane perpendicular to an axis of each eye, and each virtual points is a virtual image of each pixel in the image to be displayed on each focal plane.

In an example embodiment, the first processing element includes: a first processing subelement, arranged to project, according to the position information of each incident point, the incident light onto first display screens; a second processing subelement, arranged to determine, according to the wavefront map information, a positional relationship between the first display screen and a second display screen and a distance between the first display screen and the second display screen; and a third processing subelement, arranged to control, according to the positional relationship and the distance, a propagation direction of light transmitted by the first display screen to control the incident angle.

In an example embodiment, the control component includes: a third acquisition element, arranged to respectively acquire the position information of each virtual point corresponding to the position information of each pixel in the image to be displayed from the plurality of focal planes; and an aggregation element, arranged to execute an aggregation operation on the acquired position information of each virtual point to obtain the image to be displayed.

In an example embodiment, distances between each focal plane in the plurality of focal planes and each eye of the user are different, and an image presented in each focal plane in the plurality of focal planes is the same as the initial image.

In an example embodiment, the position information of each cornea point, the position information of each incident point and the position information of each virtual point are all coordinate information in a coordinate system formed by an axial centerline of an eyeball of the user and a plane perpendicular to the axial centerline.

In another embodiment of the disclosure, an HMD is provided, which includes: the device for controlling the image display.

In another embodiment of the disclosure, an HMD is provided, which includes:

a wavefront aberrometer, arranged to scan each eye of a user to acquire wavefront map information of each eye; a light field reconstruction component, arranged to perform three-dimensional reconstruction on an image to obtain a three-dimensional reconstructed light field by adopting a preset light field display manner; first display screens, set as display devices and arranged to perform imaging display on the three-dimensional reconstructed light field; and second display screens, arranged to receive light transmitted from the first display screens and enable, according to the wavefront map information, light of a specified direction in the light transmitted from the first display screen to pass.

In an example embodiment, the second display screens are pinhole filters.

In an example embodiment, filtering light according to the wavefront map information includes: segmenting, according to the wavefront map information, the three-dimensional reconstructed light field into a plurality of focal planes, the plurality of focal planes respectively corresponding to diopters of different parts of each eye and being focused on a retina of each eye.

In an example embodiment, a positional relationship between each of the first display screens and each of the second display screens and a distance between each of the first display screens and each of the second display screens are determined according to the wavefront map information.

In an example embodiment, the first display screens include a first display screen for a left eye of the user and a first display screen for a right eye of the user; and the second display screens include a second display screen for the left eye of the user and a second display screen for the right eye of the user.

In an example embodiment, a partition fence is arranged between display screens for the left eye and right eye of the user and made from a light-proof material.

In an example embodiment, the second display screens are closer to the eyes of the user than the first display screens.

In an example embodiment, the three-dimensional reconstructed light field is an anisotropic three-dimensional light field.

In an example embodiment, the HMD further includes: an equipment enclosure; and at least one optical element arranged between each of the second display screens and each eye of the user.

In the embodiments of the disclosure, a manner of performing three-dimensional reconstruction on the initial image to obtain the three-dimensional reconstructed light field by adopting the preset light field display manner and segmenting, according to wavefront map information, the three-dimensional reconstructed light field into the plurality of focal planes is adopted, and the plurality of focal planes are controlled to be focused on the retina of each eye of the user to correct the initial image into an image to be displayed to achieve a purpose of implementing vision correction display of a hyperopia or myopia user group by virtue of the HMD to enable this user group to clearly see VR images without external optical elements such as glasses, namely achieving good vision experiences under a naked eye condition, so that a technical effect of providing a customized image for the user to enable the user to enjoy good VR experiences under the naked eye condition is achieved, and the technical problem that the good vision experiences may not be achieved when the hyperopia or myopia user watches the image with the HMD in the related art is further solved.

BRIEF DESCRIPTION OF THE DRAWINGS

The drawings described here are adopted to provide a further understanding to the disclosure, and form a part of the disclosure. Schematic embodiments of the disclosure and descriptions thereof are adopted to explain the disclosure and not intended to form improper limits to the disclosure. In the drawings.

DETAILED DESCRIPTION

In order to make the solutions of the disclosure better understood by those skilled in the art, the technical solutions in the embodiments of the disclosure will be clearly and completely described below with reference to the drawings in the embodiments of the disclosure. Obviously, the described embodiments are not all embodiments but only part of embodiments of the disclosure. All other embodiments obtained by those skilled in the art on the basis of the embodiments in the disclosure without creative work shall fall within the scope of protection of the disclosure.

It is important to note that terms "first", "second" and the like in the specification, claims and drawings of the disclosure are adopted not to describe a specific sequence or order but to distinguish similar objects. It should be understood that data used like this may be interchanged under a proper condition for implementation of the embodiments, described here, of the disclosure in a sequence besides those shown or described here. In addition, terms "include" and "have" and any transformation thereof are intended to cover nonexclusive inclusion. For example, a process, method, system, product or equipment including a series of steps or elements is not limited to the steps or elements which are clearly listed, but may include other steps or elements which are not clearly listed or intrinsic to the process, the method, the product or the equipment.

In an embodiment of the disclosure, a method for controlling display of an image is provided. It is important to note that steps shown in the flowchart in the drawings may be executed in a computer system, such as a set of computers, capable of executing instructions. Moreover, although a logic sequence is shown in the flowchart, the shown or described steps may be executed in a sequence different from the sequence described here under some conditions.

Figure 1:
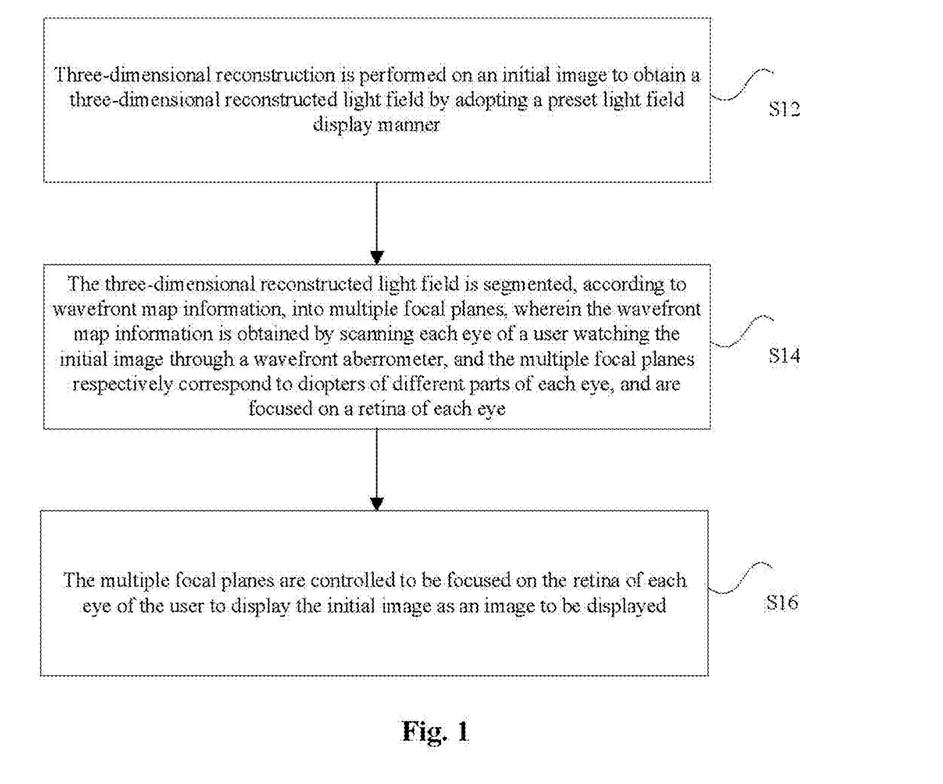
FIG. 1 is a flowchart of a method for controlling display of an image according to an embodiment of the disclosure.

FIG. 1 is a flowchart of a method for controlling display of an image according to an embodiment of the disclosure. As shown in FIG. 1, the method includes the following steps:

Step S12: three-dimensional reconstruction is performed on an initial image to obtain a three-dimensional reconstructed light field by adopting a preset light field display manner;

Step S14: the three-dimensional reconstructed light field is segmented, according to wavefront map information, into a plurality of focal planes, wherein the wavefront map information is obtained by scanning each eye of a user watching the initial image through a wavefront aberrometer, and the plurality of focal planes respectively correspond to diopters of different parts of each eye, and are focused on a retina of each eye; and Step S16: the plurality of focal planes are controlled to be focused on the retina of each eye of the user to display the initial image as an image to be displayed.

At present, when hyperopia or myopia users enjoy VR related experiences with HMDs, vision experiences are relatively poor because eyeballs may not accurately focus VR images, and a current solution widely used by an HMD manufacturer may not completely cover this user group, and may also cause discomfort and even health hazards to the users in different extents. By the steps, a manner of performing three-dimensional reconstruction on the initial image to obtain the three-dimensional reconstructed light field by adopting the preset light field display manner and segmenting, according to wavefront map information, the three-dimensional reconstructed light field into the plurality of focal planes is adopted, and the plurality of focal planes are controlled to be focused on the retina of each eye of the user to correct the initial image into the image to be displayed to achieve a purpose of implementing vision correction display of a hyperopia or myopia user group by virtue of the HMD to enable this user group to clearly see VR images without external optical elements such as glasses, namely achieving good vision experiences under a naked eye condition, so that a technical effect of providing a customized image for the user to enable the user to enjoy good VR experiences under the naked eye condition is achieved, and the technical problem that the good vision experiences may not be achieved when the hyperopia or myopia user watches the image with the HMD in the related art is further solved.

In an example implementation process, distances between each focal plane in the plurality of focal planes and each eye of the user are different, and an image presented in each focal plane in the plurality of focal planes is the same as the initial image.

Alternatively, segmenting the three-dimensional reconstructed light field into the plurality of focal planes according to the wavefront map information in Step S14 may include the following execution steps:

Step S141: position information of a cornea point corresponding to the position information of each pixel and a focal length corresponding to the position information of the cornea point from the wavefront map information are acquired according to the position information of each pixel in the image to be displayed;

Step S142: position information of each incident point of the three-dimensional reconstructed light field is acquired by adopting the position information of each pixel and the acquired focal length;

Step S143: an incident angle of incident light emitted from each incident point is controlled according to the position information of each incident point and the position information of each cornea point; and Step S144: position information of a virtual point corresponding to the position information of each incident point is determined by adopting the acquired focal length and the incident angle, and the plurality of focal planes are generated according to the position information of each virtual point, wherein each focal plane is a virtual plane perpendicular to an axis of each eye, and each virtual points is a virtual image of each pixel in the image to be displayed on each focal plane.

In an example implementation process, the position information of each cornea point, the position information of the incident points and the position information of the virtual points are all coordinate information in coordinate systems formed by axial centerlines of eyeballs of the user and planes perpendicular to the axial centerlines.

In an example embodiment, vision correction display may be implemented by adding a light field display technology and a dual-stack Liquid Crystal Display (LCD) into an HMD. The image to be displayed is reconstructed into an anisotropic three-dimensional light field by virtue of a light field display, and then a display parameter of a dual-stack LCD display screen is established according to a wavefront map, acquired by the wavefront aberrometer, of the user. An effect of segmenting the light field of the image into a plurality of two-dimensional image instances (i.e. the above-mentioned focal planes) is finally achieved, and each image instance is focused relative to given sub-apertures of eye (diopters of each position of a human eye are different because the human eye is not a smooth sphere, and eye sub-apertures may be understood as a plurality of concentric circles with different diopters on the human eye) to ensure that these image instances are seen under specific diopters. These image Instances may be virtually placed at different depths, and are finally focused into a single image on the retina of each eye of the user, so that the user may focus on a proper image according to own cornea and lens adjustment condition.

Figure 2:
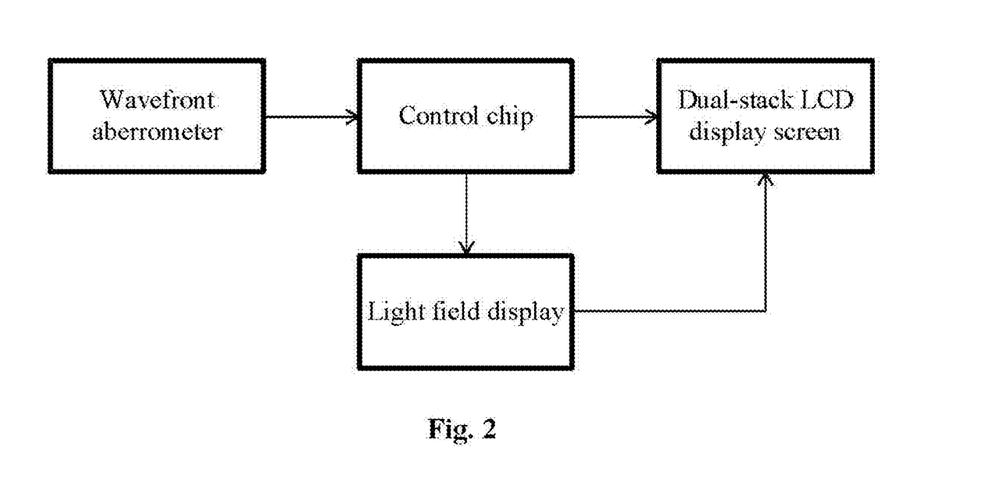
FIG. 2 is a schematic diagram of a process of segmenting, according to wavefront map information, a three-dimensional reconstructed light field into a plurality of focal planes according to an example embodiment of the disclosure.

FIG. 2 is a schematic diagram of a process of segmenting a three-dimensional reconstructed light field into a plurality of focal planes according to wavefront map information according to an example embodiment of the disclosure. As shown in FIG. 2, the wavefront map is obtained by scanning the human eyes by virtue of the wavefront aberrometer. Considering that the image may not be directly seen clearly by the hyperopia or myopia group user, it is necessary to provide customized correction for the user through related data of the wavefront map. The wavefront map reflects diopter and aberration conditions (differences between an image displayed by a screen and an image presented in each human eye), obtained by a wavefront aberration technology, of each point in all visual pathway ranges (all areas where light may be refracted into the retina) of each human eye. The image may be regulated for the user to clearly see after the diopter conditions of each point in the eyes of the user are acquired. In a process of using the HMD by the hyperopia/myopia group user, the wavefront map of the eyes of the user is acquired at first by virtue of the wavefront aberrometer, and after information data of the wavefront map is transmitted to a control chip, a control center calculates setting parameters of the segment light field, and transmits these setting parameters to the dual-stack LCD display screen; and then, the image to be displayed is transmitted into the light field display as input, and the three-dimensional light field reconstructed by the light field display passes through a series of focal planes (planes passing through focal points and perpendicular to a primary optical axis of a system) obtained by the dual-stack LCD display screen which has finished parameter configuration and corresponding to different diopters.

Alternatively, controlling the incident angle of the incident light emitted from each incident point in Step S143 may include the following processing steps:

Step S1421: the incident light onto a first display screen is projected according to the position information of each incident point;

Step S1422: a positional relationship between the first display screen and a second display screen and a distance between the first display screens and the second display screens are determined according to the wavefront map information; and Step S1423: a propagation direction of light transmitted by the first display screen to control the incident angle is controlled according to the positional relationship and the distance.

For specific pixels specifically imaged on the retinas, obtained positions of the specific pixels may be ensured to be the same by changing distances between each incident point of the three-dimensional reconstructed light field and the axial centerlines of the eyeballs of the user for different eyeball diopters. A process of changing the distances between each incident point of the three-dimensional reconstructed light field and the axial centerlines of the eyeballs of the user may be implemented through the dual-stack screen, wherein the first display screen is arranged to directly display the light emitted by each incident point, the second display screen is arranged to filter the light, and each pixel thereon may determine whether to allow the light to pass or not and directions of the light which is allowed to pass, thereby achieving an effect of changing values of the distances. The plurality of focal planes are finally generated according to different position information of each cornea point, and if it is expected to converge the light on pixels at the same positions, a plurality of different distance values are required.

In a specific implementation process, after the position information of each cornea point and the position information of each incident point are acquired, the positional relationship between the first display screen and the second display screen may be determined according to the wavefront map information, that is, the first display screen and the second display screen are arranged in parallel, the distance between the first display screen and the second display screen may be determined, and propagation directions of the incident light emitted from each incident point may further be determined according to the positional relationship and the distance.

Alternatively, controlling the plurality of focal planes to be focused on the retina of each eye of the user to correct the initial image into the image to be displayed in Step S16 may include the following execution steps:

Step S161: the position information of each virtual point corresponding to the position information of each pixel in the image to be displayed from the plurality of focal planes is acquired respectively; and Step S162: an aggregation operation on the acquired position information of each virtual point is executed to obtain the image to be displayed.

That is, each pixel in the image to be displayed is formed by converging the corresponding virtual point on the plurality of focal planes.

Figure 3:
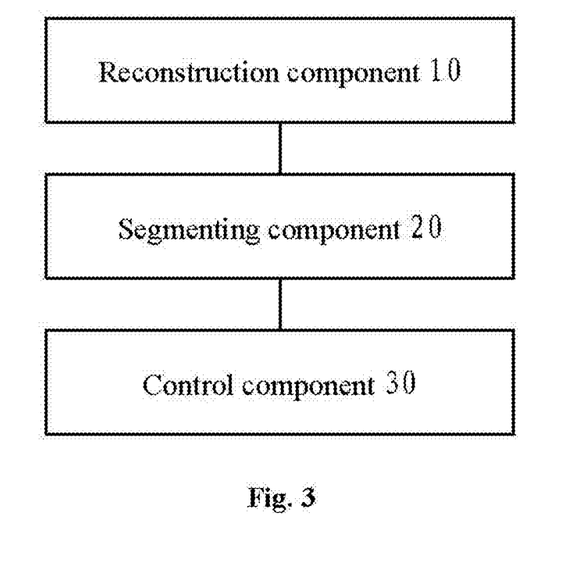
FIG. 3 is a structural block diagram of a device for controlling display of an image according to an embodiment of the disclosure.

According to the embodiments of the disclosure, an embodiment of a device for controlling display of an image is further provided. FIG. 3 is a structural block diagram of a device for controlling the image display according to an embodiment of the disclosure. As shown in FIG. 3, the device may include: a reconstruction component 10, arranged to perform three-dimensional reconstruction on an initial image to obtain a three-dimensional reconstructed light field by adopting a preset light field display manner; a segmenting component 20, arranged to segment, according to wavefront map information, the three-dimensional reconstructed light field into a plurality of focal planes, wherein the wavefront map information is obtained by scanning each eye of a user watching the initial image through a wavefront aberrometer, and the plurality of focal planes respectively correspond to diopters of different parts of each eye, and are focused on a retina of each eye; and a control component 30, arranged to control the plurality of focal planes to be focused on the retina of each eye of the user to display the initial image as an image to be displayed.

In an example implementation process, distances between each focal plane in the plurality of focal planes and each eye of the user are different, and an image presented in each focal plane in the plurality of focal planes is the same as the initial image.

Alternatively, the segmenting component 20 may include: a first acquisition element (not shown in the figure), arranged to acquire, according to position information of each pixel in the image to be displayed, position information of a cornea point corresponding to the position information of each pixel and a focal length corresponding to the position information of each cornea point from the wavefront map information; a second acquisition element (not shown in the figure), arranged to acquire position information of each incident point of the three-dimensional reconstructed light field by adopting the position information of each pixel and the acquired focal length; a first processing element, arranged to control, according to the position information of each incident point and the position information of each cornea point, an incident angle of incident light emitted from each incident point; and a second processing element, arranged to determine position information of a virtual point corresponding to the position information of each incident point by adopting the acquired focal length and the incident angle, and generate the plurality of focal planes according to position information of each virtual point, wherein each focal plane is a virtual plane perpendicular to an axis of each eye, and each virtual point is a virtual image of each pixel in the image to be displayed on each focal plane.

In an example implementation process, the position information of each cornea point, the position information of each incident point and the position information of each virtual point are all coordinate information in a coordinate system formed by an axial centerlines of eyeball of the user and a plane perpendicular to the axial centerlines.

Alternatively, the first processing element may include: a first processing subelement (not shown in the figure), arranged to project, according to the position information of each incident point, the incident light onto first display screens; a second processing subelement (not shown in the figure), arranged to determine, according to the wavefront map information, a positional relationship between the first display screen and a second display screen and a distance between the first display screen and the second display screen; and a third processing subelement, arranged to control, according to the positional relationship and the distance, a propagation direction of light transmitted by the first display screen to control the incident angle.

Alternatively, the control component 30 may include: a third acquisition element (not shown in the figure), arranged to respectively acquire the position information of each virtual point corresponding to the position information of each pixel in the image to be displayed from the plurality of focal planes; and an aggregation element (not shown in the figure), arranged to execute an aggregation operation on the acquired position information of each virtual point to obtain the image to be displayed.

The example implementation process will be further described below in detail with reference to the following example implementation mode.

Figure 4:
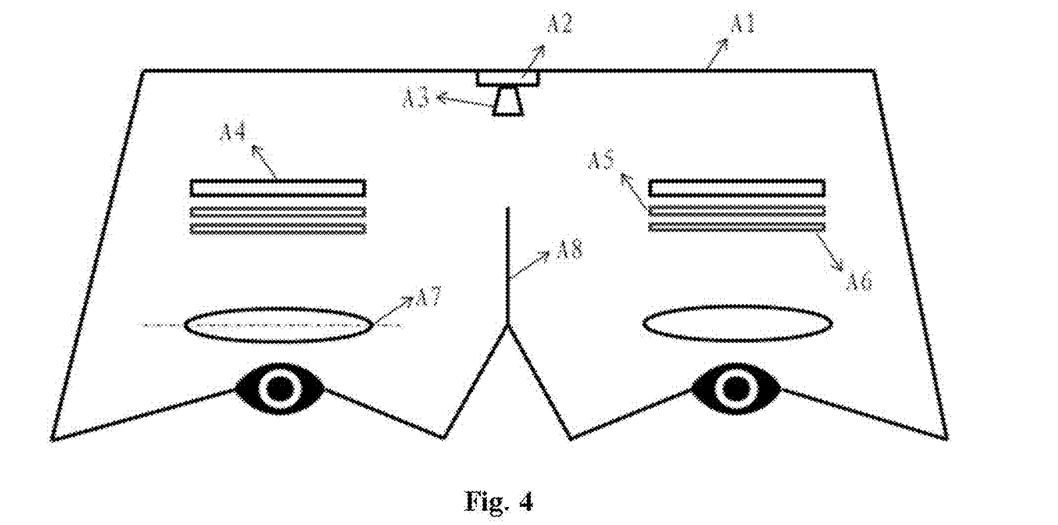
FIG. 4 is an internal structural diagram of an HMD according to an example embodiment of the disclosure.

FIG. 4 is an internal structure diagram of an HMD according to an example embodiment of the disclosure. As shown in FIG. 4, an internal structure of the HMD provided in an example embodiment may include, but not limited to, the following parts:

A1 represents a housing of the HMD;

A2 and A3 respectively represent a base and body of the wavefront aberrometer;

A4 represents a light field display (equivalent to the abovementioned reconstruction component);

A5 represents an LCD screen configured for display in the dual-stack LCD display screen (equivalent to the abovementioned first display screen);

A6 represents an LCD screen configured for pinhole filtering in the dual-stack LCD display screen (equivalent to the abovementioned second display screen);

A7 represents an optical element (for example: a lens) arranged between each display screen and each eye of the user, configured for secondary imaging; and A8 represents a partition fence made from opaque material, which avoids mutual interference of images of left and right LCD display screens.

In addition, a function realized by the segmenting component may be realized by controlling the dual-stack display screen through a control chip not shown in the figure. A function achieved by the control component may be implemented through the control chip.

A basic principle of the technical solution is that: the light field display and the wavefront aberrometer are added into the HMD, light field three-dimensional reconstruction is performed on the image to be displayed, the obtained light field is segment into the plurality of focal planes by virtue of the dual-stack LCD display screen, and each focal plane is anisotropic (which is opposite to isotropic, and refers to a characteristic that all or part of physical and chemical properties and the like of an object change according to different directions), respectively corresponds to different diopters, and is finally focused on a retina of each eye of the user, thereby improving visual effect of naked eye.

Diopter and aberration conditions (differences between an image displayed by a screen and an image presented in each human eye), are obtained by the wavefront aberration technology, of each point in all the visual pathway ranges (all the areas where the light may be refracted into the retina) of each human eye. The wavefront aberrometer obtains data such as influence of focusing of different areas of each human eye on aberrations and influence of changes in the diopters on the aberrations through the wavefront aberration technology.

Figure 5:
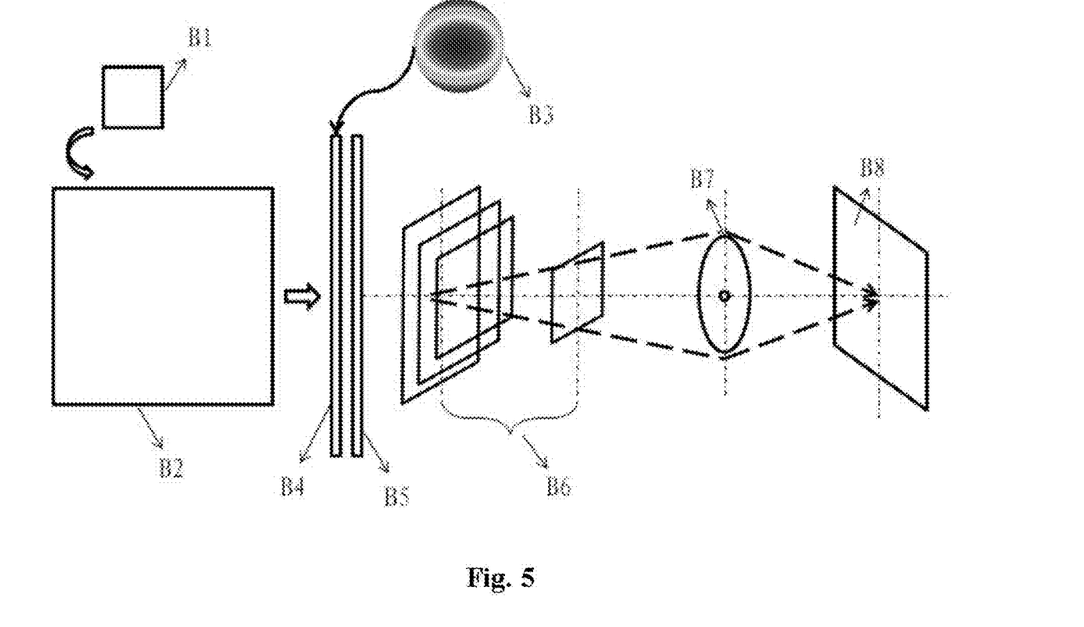
FIG. 5 is a schematic diagram of a process of controlling display of an initial image according to an example embodiment of the disclosure.

FIG. 5 is a schematic diagram of a process of controlling display of an initial image according to an example embodiment of the disclosure. As shown in FIG. 5, B1 represents input image information, i.e. an image finally required to be presented in each eye of a user; B2 represents a three-dimensional reconstructed light field to be used obtained by performing light field three-dimensional reconstruction on the input image information, three-dimensional reconstruction is performed on the image to be displayed through a light field display technology, the input image information is a two-dimensional image seen on a television or a computer at ordinary times, i.e. a display result of a specific object at a specific angle, the three-dimensional reconstructed light field obtained by processing with the light field display technology is presented as the specific object existing in a real world, then the object may be observed from different angles, and the object may be felt as a three-dimensional image; B3 represents a wavefront map, acquired by a wavefront aberrometer, of each eye of the user; B4 and B5 represent dual-stack LCD display screens; B6 represents a series of focal planes corresponding to different diopters; B7 represents a cornea and lense of each eye of the user; and B8 represents a retina of each eye of the user, A process of transforming B1 into B2 is implemented through a light field display; and the transformation process is related to a principle of the adopted light field display. For example, a common integrated light field reconstruction technology is adopted. After input of B1 is obtained, the light field display may make analysis to obtain images under different visual angles, then array displays (display with n rows*n columns) on the light field display are adopted, an image displayed by each display in array displays is a combination of images under different visual angles in a specific three-dimensional area, and the images of these array displays may be finally integrated to reconstruct a spatial light field, i.e. B2, of a three-dimensional object. The three-dimensional reconstructed light field to be used may be obtained by taking B1 as input of the light field display, taking B2 as output of the light field display and performing light field three-dimensional reconstruction on B1 by adopting the light field display. Each human eye is scanned to acquire B3 to provide diopter and focal length information of each point of each human eye for segmenting B2 as an auxiliary data parameter through the wavefront aberrometer, and then B6 is obtained after B2 passes through B4 and B5, that is, B2 is input of B4 and B5, and B6 is output of B4 and B5. Although depths (distances) of each focal plane in B6 relative to each eye of the user are different, images presented on each focal plane are completely the same as B1, and are finally converged on B8 through B7. These focal planes may be focused into single images on the retina of each eye of the user, so that a purpose of vision correction display is finally fulfilled.

Figure 6:
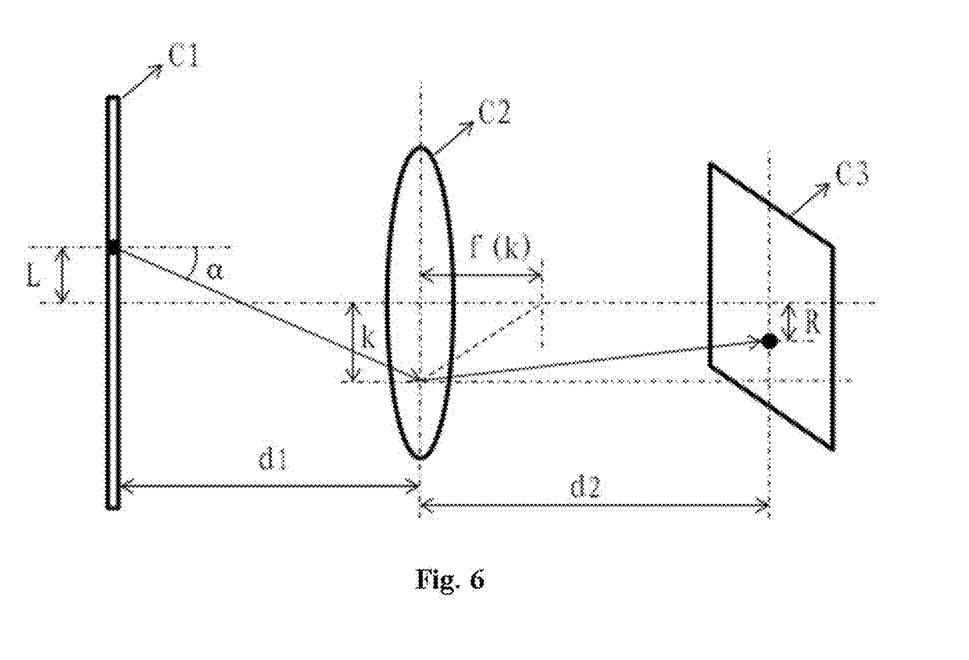
FIG. 6 is a universal light path diagram for light field display according to an example embodiment of the disclosure.

FIG. 6 is a universal light path diagram for light field display according to an example embodiment of the disclosure. As shown in FIG. 6, an ordinary light path diagram illustrating that light in a light field enters each human eye is shown, wherein C1 is a light field display, C2 is a cornea and lens of each eye of a user and C3 is a retina of the user.

A distance between the light field display and each human eye is d1, and an axial distance of an eyeball is d2, wherein d1 and d2 are positive numbers. Light of the light field display is emitted from a position L at an angle α, and reaches the retina at a position R after passing through a cornea point at a position k, wherein a focal length of the cornea point at the position k may be obtained through a wavefront map of the eye, i.e. f(k), which is a positive number and corresponds to focal lengths of different points (i.e. the abovementioned eye sub-apertures) on each human eye. According to the light path diagram, it may be directly learned about, by virtue of geometric knowledge, that a mutual relationship between the light emitted from the position L and passing through the cornea point at the position k and the retina at the position R is as follows:

$$R(L, k) = d_2\left(\frac{-k}{f(k)} + \tan\alpha\right) + k$$

Since k and the distance d1 between the light field display and each human eye form a relationship as follows:

$$k = L + \tan\alpha * d_1$$

it may be obtained that:

$$R(L, k) = -\frac{d_2}{d_1}L + \left(\frac{-d_2}{f(k)} + \frac{d_2}{d_1} + 1\right)k$$

Values of L, k and R in the formulae are positive or negative. In an example embodiment, L, k and R represent coordinate information of a corresponding point in a coordinate system formed by an axial centerline of the eyeball of the user and a plane perpendicular to the axial centerline. The angle α is also positive or negative, and ranges from −90 degrees to +90 degrees. In an example embodiment, the deflection angle α corresponds to a fourth quadrant position of the coordinate system, and is a negative value.

Thus it can be seen that: if the distance d1 between the light field display and each human eye and the axial distance d2 of the eyeball (an axial distance of a human eyeball is usually 23.8 mm) are fixed values, a position of an imaging point on the retina is associated with incident light on the display and a wavefront map characteristic of the human eyeball. Therefore, an imaging position on the retina of each human eye may be determined according to specific wavefront map information of the user (i.e. a position of each pixel on the display is calculated and regulated according to the wavefront map of each human eye) and information of the incident light (i.e. an angle of the corresponding incident light). A matrix form may be adopted for representation as follows:

$$\begin{bmatrix} R_1, k_1 & \cdots & R_r, k_1 \\ \vdots & \ddots & \vdots \\ R_1, k_n & \cdots & R_r, k_n \end{bmatrix} = \begin{bmatrix} a & g(k_1) \\ \vdots & \vdots \\ a & g(k_n) \end{bmatrix} * \begin{bmatrix} L_1 & \cdots & L_r \\ 1 & \cdots & 1 \end{bmatrix}$$

In which a left-side matrix is an image expected to be presented on the retina, and may be obtained by performing a multiplication operation on two right-side matrixes, that is, an emitting point and emitting angle of the light are regulated according to different wavefront map characteristics; and in the matrix formula, α is $$-\frac{d_2}{d_1},$$

and is a constant, g(k) is $$\left(\frac{-d_2}{f(k)} + \frac{d_2}{d_1} + 1\right)k,$$

and is related to the wavefront map of the eye of the user, and L is position information of the light on a display screen.

It is necessary to generate images which may be focused on the retina for different diopters in the technical solution provided by the disclosure, so that such a requirement is met by calculating a plurality of values of L representing the position information of the light on the display screen in the right-side matrixes on the premise of keeping the left-side matrix involved in the matrix multiplication formula unchanged. In short, a specific point on the display screen is required to emit light in different directions, that is, display results, observed in different directions, of the specific point on the display screen are different. This is impossible for an ordinary display, so that the light field display is adopted as a secondary input device of the solution in the solution because light field display may meet the requirement by virtue of a characteristic of anisotropy.

In addition, even under the condition that the display capable of achieving anisotropy exists and the emitting point and emitting angle of the light may be calculated, an additional device is also required to meet requirements on the emitting point and emitting angle of the light. Therefore, the dual-stack LCD display screens represented by B4 and B5 shown in FIG. 3 are adopted in the solution, wherein B4 is used as a display device, B5 is used as a pinhole filter, and is arranged to determine a specific propagation direction of the light transmitted by B4, the light is emitted at a specific position on B4 according to the calculated emitting point and emitting angle, and the propagation direction of the light is determined on B5.

Serial numbers of the embodiments of the disclosure are adopted for description and not intended to indicate quality of the embodiments.

In the embodiments of the disclosure, each embodiment is described with different emphasis, and parts which are not elaborated in a certain embodiment may refer to related descriptions in the other embodiments.

In some embodiments provided by the disclosure, it should be understood that the disclosed technical contents may be implemented in another manner. Moreover, the device embodiment described above is only schematic. For example, division of the elements is only logic function division, and other division manners may be adopted during practical implementation. For example, a plurality of elements or components may be combined or integrated into another system, or some characteristics may be neglected or not executed. In addition, coupling or direct coupling or communication connection between the displayed or discussed components may be indirect coupling or communication connection, implemented through some interfaces, of the elements or components, and may be electrical or adopt other forms.

The elements described as separate parts may or may not be physically separated, and parts displayed as elements may or may not be physical elements, and namely may be located in the same place, or may also be distributed to a plurality of network elements. Part or all of the elements may be selected to achieve the purpose of the solutions of the disclosure according to a practical requirement.

In addition, each function element in each embodiment of the disclosure may be integrated into a processing element, each element may also independently physically exist, and two or more than two element may also be integrated into a element. The integrated element may be implemented in a hardware form, and may also be implemented in form of software function element.

When being implemented in form of software function element and sold or used as an independent product, the integrated element may be stored in a computer-readable storage medium. Based on such an understanding, the technical solutions of the disclosure substantially or parts making contributions to a conventional art or all or part of the technical solutions may be embodied in form of software product, and the computer software product is stored in a storage medium, including a plurality of instructions arranged to enable a computer device (which may be a personal computer, a server, a network device or the like) to execute all or part of the steps of the method in each embodiment of the disclosure. The abovementioned storage medium includes: various media capable of storing program codes such as a U disk, a Read-Only Memory (ROM), a Random Access Memory (RAM), a mobile hard disk, a magnetic disk or an optical disk.

The above are only example implementation modes of the disclosure. It should be pointed out that those skilled in the art may also make a plurality of improvements and embellishments without departing from the principle of the disclosure and these improvements and embellishments shall also fall within the scope of protection of the disclosure.

INDUSTRIAL APPLICABILITY

As described above, the method and device for controlling display of the image and the HMD provided by the embodiment of the disclosure have benefits as follows: a purpose of implementing vision correction display of a hyperopia or myopia user group by virtue of the HMD to enable this user group to clearly see VR images without external optical elements such as glasses, namely achieving good vision experiences under a naked eye condition, so that a technical effect of providing a customized image for the user to enable the user to enjoy good VR experiences under the naked eye condition is achieved, and the technical problem that the good vision experiences may not be achieved when the hyperopia or myopia user watches the image with the HMD in the related art is further solved.

What is claimed is:

1. A method for controlling display of an image, comprising:
    performing three-dimensional reconstruction on an initial image to obtain a three-dimensional reconstructed light field by adopting a preset light field display manner;
    segmenting, according to wavefront map information, the three-dimensional reconstructed light field into a plurality of focal planes, wherein the wavefront map information is obtained by scanning each eye of a user watching the initial image through a wavefront aberrometer, and the plurality of focal planes respectively correspond to diopters of different parts of each eye, and are focused on a retina of each eye; and controlling the plurality of focal planes to be focused on the retina of each eye of the user to display the initial image as an image to be displayed;

wherein segmenting the three-dimensional reconstructed light field into the plurality of focal planes according to the wavefront map information comprises: acquiring, according to position information of each pixel in the image to be displayed, position information of a cornea point corresponding to the position information of each pixel and a focal length corresponding to the position information of the cornea point from the wavefront map information acquiring position information of each incident point of the three-dimensional reconstructed light field by adopting the position information of each pixel and the acquired focal length; controlling, according to the position information of each incident point and the position information of each cornea point, an incident angle of incident light emitted from each incident point; and determining position information of a virtual point corresponding to the position information of each incident point by adopting the acquired focal length and the incident angle, and generating the plurality of focal planes according to position information of each virtual point, wherein each focal plane is a virtual plane perpendicular to an axis of each eye, and each virtual point is a virtual image of each pixel in the image to be displayed on each focal plane.

2. The method as claimed in claim 1, wherein controlling the incident angle of the incident light emitted from each incident point comprises:

projecting, according to the position information of each incident point, the incident light onto a first display screen;

determining, according to the wavefront map information, a positional relationship between the first display screen and a second display screen and a distance between the first display screen and the second display screen; and controlling, according to the positional relationship and the distance, a propagation direction of light transmitted by the first display screen to control the incident angle.

3. The method as claimed in claim 1, wherein controlling the plurality of focal planes to be focused on the retina of each eye of the user to correct the initial image into the image to be displayed comprises:

respectively acquiring the position information of each virtual point corresponding to the position information of each pixel in the image to be displayed from the plurality of focal planes; and executing an aggregation operation on the acquired position information of each virtual point to obtain the image to be displayed.

4. The method as claimed in claim 1, wherein distances between each focal plane in the plurality of focal planes and each eye of the user are different, and an image presented in each focal plane in the plurality of focal planes is the same as the initial image.

5. The method as claimed in claim 1, wherein the position information of each cornea point, the position information of each incident point and the position information of each virtual point are all coordinate information in a coordinate system formed by an axial centerline of an eyeball of the user and a plane perpendicular to the axial centerline.

6. A device for controlling display of an image, comprising:

a reconstruction component, arranged to perform three-dimensional reconstruction on an initial image to obtain a three-dimensional reconstructed light field by adopting a preset light field display manner;

a segmenting component, arranged to segment, according to wavefront map information, the three-dimensional reconstructed light field into a plurality of focal planes, wherein the wavefront map information is obtained by scanning each eye of a user watching the initial image through a wavefront aberrometer, and the plurality of focal planes respectively correspond to diopters of different parts of each eye, and are focused on a retina of each eye; and a control component, arranged to control the plurality of focal planes to be focused on the retina of each eye of the user to display the initial image as an image to be displayed;

wherein the segmenting component comprises: a first acquisition element, arranged to acquire, according to position information of each pixel in the image to be displayed, position information of a cornea point corresponding to the position information of each pixel and a focal length corresponding to the position information of each cornea point from the wavefront map information; a second acquisition element, arranged to acquire position information of each incident point of the three-dimensional reconstructed light field by adopting the position information of each pixel and the acquired focal length; a first processing element, arranged to control, according to the position information of each incident point and the position information of each cornea point, an incident angle of incident light emitted from each incident point; and a second processing element, arranged to determine position information of a virtual point corresponding to the position information of each incident point by adopting the acquired focal length and the incident angle, and generate the plurality of focal planes according to position information of each virtual point, wherein each focal plane is a virtual plane perpendicular to an axis of each eye, and each virtual points is a virtual image of each pixel in the image to be displayed on each focal plane.

7. The device as claimed in claim 6, wherein the first processing element comprises:

a first processing subelement, arranged to project, according to the position information of each incident point, the incident light onto first display screens;

a second processing subelement, arranged to determine, according to the wavefront map information, a positional relationship between the first display screen and a second display screen and a distance between the first display screen and the second display screen; and a third processing subelement, arranged to control, according to the positional relationship and the distance, a propagation direction of light transmitted by the first display screen to control the incident angle.

8. The device as claimed in claim 6, wherein the control component comprises:

a third acquisition element, arranged to respectively acquire the position information of each virtual point corresponding to the position information of each pixel in the image to be displayed from the plurality of focal planes; and an aggregation element, arranged to execute an aggregation operation on the acquired position information of each virtual point to obtain the image to be displayed.

9. The device as claimed in claim 6, wherein distances between each focal plane in the plurality of focal planes and each eye of the user are different, and an image presented in each focal plane in the plurality of focal planes is the same as the initial image.

10. The device as claimed in claim 6, wherein the position information of each cornea point, the position information of each incident point and the position information of each virtual point are all coordinate information in a coordinate system formed by an axial centerline of an eyeball of the user and a plane perpendicular to the axial centerline.

11. A Head-Mounted Display (HMD), comprising the device for controlling the image display as claimed in claim 6.

12. A Head-Mounted Display (HMD), comprising:
a wavefront aberrometer, arranged to scan each eye of a user to acquire wavefront map information of each eye;
a light field reconstruction component, arranged to perform three-dimensional reconstruction on an image to obtain a three-dimensional reconstructed light field by adopting a preset light field display manner;
first display screens, set as display devices and arranged to perform imaging display on the three-dimensional reconstructed light field; and
second display screens, arranged to receive light transmitted from the first display screens and enable, according to the wavefront map information, light of a specified direction in the light transmitted from the first display screen to pass;
wherein a positional relationship between each of the first display screens and each of the second display screens and a distance between each of the first display screens and each of the second display screens are determined according to the wavefront map information.

13. The HMD as claimed in claim 12, wherein
the second display screens are pinhole filters.

14. The HMD as claimed in claim 12, wherein filtering light according to the wavefront map information comprises:
segmenting, according to the wavefront map information, the three-dimensional reconstructed light field into a plurality of focal planes, the plurality of focal planes respectively corresponding to diopters of different parts of each eye and being focused on a retina of each eye.

15. The HMD as claimed in claim 12, wherein
the first display screens comprise a first display screen for a left eye of the user and a first display screen for a right eye of the user; and
the second display screens comprise a second display screen for the left eye of the user and a second display screen for the right eye of the user.

16. The HMD as claimed in claim 15, wherein
a partition fence is arranged between display screens for the left eye and right eye of the user and made from a light-proof material.

17. The HMD as claimed in claim 12, wherein
the second display screens are closer to the eyes of the user than the first display screens;
or the three-dimensional reconstructed light field is an anisotropic three-dimensional light field;
or the HMD further comprises: an equipment enclosure; and at least one optical element arranged between each of the second display screens and each eye of the user.

* * * * *